(12) United States Patent
Yao et al.

(10) Patent No.: US 7,767,744 B2
(45) Date of Patent: Aug. 3, 2010

(54) RESIN COMPOSITION, RESIN COMPACT, PRODUCTION METHOD OF RESIN COMPACT AND RECYCLING METHOD OF RESIN COMPACT

(75) Inventors: Kenji Yao, Kanagawa (JP); Masahiro Moriyama, Kanagawa (JP); Fumiyuki Suzuki, Tokyo (JP); Tadashi Mochizuki, Kanagawa (JP); Hidetoshi Kawasaki, Kanagawa (JP)

(73) Assignees: Fuji Xerox Co., Ltd., Tokyo (JP); Fuji Film Corporation, Tokyo (JP)

( * ) Notice: Subject to any disclaimer, the term of this patent is extended or adjusted under 35 U.S.C. 154(b) by 0 days.

(21) Appl. No.: 12/078,297

(22) Filed: Mar. 28, 2008

(65) Prior Publication Data

US 2008/0237910 A1    Oct. 2, 2008

(30) Foreign Application Priority Data

Mar. 30, 2007  (JP) ............................. 2007-092711
Dec. 12, 2007  (JP) ............................. 2007-321186

(51) Int. Cl.
*C08K 3/32*    (2006.01)

(52) U.S. Cl. ...................... 524/414; 523/201
(58) Field of Classification Search .................. 524/414
See application file for complete search history.

(56) References Cited

U.S. PATENT DOCUMENTS

| | | | | |
|---|---|---|---|---|
| 6,833,075 B2 * | 12/2004 | Hughes | ...................... | 210/679 |
| 2005/0143502 A1 | 6/2005 | Yamada et al. | | |
| 2006/0074155 A1 * | 4/2006 | Wit et al. | ..................... | 524/115 |

FOREIGN PATENT DOCUMENTS

| | | |
|---|---|---|
| JP | 2003-192929 | 7/2003 |
| JP | 2004-027079 | 1/2004 |
| JP | 2004-190025 | 7/2004 |
| JP | 2005-048066 | 2/2005 |

* cited by examiner

*Primary Examiner*—Peter Szekely
(74) *Attorney, Agent, or Firm*—Oliff & Berridge, PLC (57) ABSTRACT

A resin composition, includes: an aliphatic polyester; a second polymer compound having a glass transition point higher than a glass transition point of the aliphatic polyester; and aluminum phosphate.

9 Claims, 2 Drawing Sheets

RESIN COMPOSITION, RESIN COMPACT, PRODUCTION METHOD OF RESIN COMPACT AND RECYCLING METHOD OF RESIN COMPACT

CROSS-REFERENCE TO RELATED APPLICATION

This application is based on and claims priority under 35 USC 119 from Japanese Patent Application Nos. 2007-092711 filed Mar. 30, 2007 and 2007-321186 filed Dec. 12, 2007.

BACKGROUND

1. Technical Field

The present invention relates to a resin composition, a resin compact, a production method of the resin compact, and a recycling method of the resin compact.

2. Related Art

In view of environmental protection, a biodegradable resin such as aliphatic polyester is recently taken notice of as a biomass material.

As for the resin compact using a biodegradable resin, those having blended therein a flame retardant for the purpose of enhancing the flame retardance are known. The flame retardant includes various types such as phosphorus-based flame retardant, bromine-based flame retardant, chlorine-based flame retardant, nitrogen compound-based flame retardant and silicone-based flame retardant.

SUMMARY

According to an aspect of the invention, there is provided a resin composition, including: an aliphatic polyester; a second polymer compound having a glass transition point higher than a glass transition point of the aliphatic polyester; and aluminum phosphate.

BRIEF DESCRIPTION OF THE DRAWINGS

Exemplary embodiments of the present invention will be described in detail based on the following figures, wherein.

DETAILED DESCRIPTION

Preferred exemplary embodiments of the present invention are described in detail below, if desired, by referring to the drawings.

(Resin Composition)

The resin composition according to the first exemplary embodiment of the present invention comprises an aliphatic polyester, a second polymer compound having a glass transition point higher than the glass transition point of the aliphatic polyester, and aluminum phosphate.

The aliphatic polyester is not particularly limited but is preferably an aliphatic polyester having bio-degradability, more preferably a plant-derived aliphatic polyester. Specific examples thereof include polylactic acid, poly(3-hydroxybutyric acid), polybutylene succinate, polybutylene adipate, polyethylene succinate, polyethylene adipate, polypropylene succinate, polypropylene adipate, polyhexylene succinate and polyhexylene adipate. Among these aliphatic polyesters, polylactic acid is preferred in view of balance between the flame retardance and the mechanical strength (particularly, impact resistant strength). One of these aliphatic polyesters may be used alone or two or more thereof may be used in combination. A copolymer of two or more of these aliphatic polyesters may also be used.

The weight average molecular weight of the aliphatic polyester is preferably from 5,000 to 200,000, more preferably from 10,000 to 120,000. The number average molecular weight of the aliphatic polyester is preferably from 3,000 to 100,000, more preferably from 5,000 to 70,000. If the weight average molecular weight and number average molecular weight of the aliphatic polyester each is less than the lower limit above, the impact resistant strength tends to be insufficient, whereas if it exceeds the upper limit above, insufficient moldability is liable to result.

The content of the aliphatic polyester is not particularly limited but is preferably from 20 to 80 mass %, more preferably from 21 to 70 mass %, based on the entire amount of the resin composition. If the content of the aliphatic polyester is less than the lower limit above, the recycling property tends to deteriorate to cause a large environmental load, whereas if it exceeds the upper limit above, the mechanical strength or heat resistance tends to be insufficient.

The second polymer compound is not particularly limited as long as it has a glass transition point higher than the glass transition point of the aliphatic polyester, and specific examples thereof include polycarbonate, polyarylate, aromatic polyester, polyamide, polyimide, polymethyl methacrylate, polystyrene, polyoxymethylene, polyphenylene oxide and acrylonitrile-butadiene-styrene resin (ABS resin), which each has a glass transition point higher than the glass transition point of the aliphatic polyester. Among these, polycarbonate and ABS resin are preferred in view of a higher effect of enhancing the impact resistant strength, and polycarbonate is more preferred. One of these second polymer compounds may be used alone, or two or more kinds thereof may be used in combination. Also, a copolymer of two or more of these polymer compounds may be used as the second polymer compound.

Incidentally, the glass transition point of the aliphatic polyester or second polymer compound means a glass transition point measured as follows. That is, the heat spectrum is measured under the temperature rising condition of 10° C./min by a differential calorimeter (Differential Scanning Calorimeter DSC-60, manufactured by Shimadzu Corp.), and the intermediate value (Tgm) between two shoulder values determined by the tangential method from peaks derived from glass transition is defined as the glass transition point.

The glass transition points of the aliphatic polyester and second polymer compound are not particularly limited as long as the relationship between these two glass transition points satisfy the above-described condition, but the glass transition point of the aliphatic polyester is preferably from −30 to 80° C., more preferably from 0 to 70° C., and the glass transition point of the second polymer compound is preferably from 0 to 300° C., more preferably from 70 to 160° C. Also, the difference between the glass transition point of the aliphatic polyester and the glass transition point of the second polymer compound is preferably from 5 to 250° C., more preferably from 10 to 100° C. In particular, if this temperature difference is less than 5° C., the effects of enhancing the heat resistance, impact resistance and flame retardance, which should be provided by the second polymer material, are liable to decrease, whereas if it exceeds 250° C., setting of the shaping temperature tends to be difficult due to the excessively large difference in the flowability at the same temperature.

The weight average molecular weight and number average molecular weight of the second polymer compound are not particularly limited as long as the glass transition point of the second polymer compound is higher than the glass transition point of the aliphatic polyester, but the weight average molecular weight of the second polymer compound is preferably from 5,000 to 100,000, more preferably from 10,000 to 80,000. The number average molecular weight of the second polymer compound is preferably from 2,500 to 40,000, more preferably from 3,000 to 30,000. If the weight average molecular weight and number average molecular weight of the second polymer compound each is less than the lower limit above, insufficient impact resistant strength tends to result, whereas if it exceeds the upper limit above, the moldability is liable to be insufficient. The weight average molecular weight and number average molecular weight of each of the aliphatic polyester and second polymer compound in the resin composition mean the weight average molecular weight and the number average molecular weight of the aliphatic polyester or second polymer compound measured by a gel permeation chromatograph. As for the gel permeation chromatograph, HLC-8220GPC manufactured by Tosoh Corp. may be used. Also, in the case of determining the weight average molecular weight and number average molecular weight of each of the aliphatic polyester and second polymer compound in the resin composition, the sample for measurement is dissolved in deuterated chloroform to a concentration of 0.1 mass % and after separation from the solution by a gel permeation chromatograph, the weight average molecular weight and number average molecular weight of the aliphatic polyester or second polymer compound can be measured.

The content of the second polymer compound is preferably from 10 to 70 mass %, more preferably from 35 to 65 mass %, based on the entire amount of the resin composition. If the content of the second polymer compound is less than the lower limit above, the heat resistance is liable to decrease, whereas if it exceeds the upper limit above, the shaping temperature becomes high and the mechanical strength of the resulting resin compact tends to decrease.

The phosphorus content in the aluminum phosphate is preferably 20 mass % or more, more preferably 27 mass % or more, still more preferably 29 mass % or more. If the phosphorus content in the aluminum phosphate is less than 20 mass %, it tends to be difficult to satisfy both the flame retardance and mechanical strength (particularly, impact resistant strength). Also, the phosphorus content in the aluminum phosphate is preferably 50 mass % or less, more preferably 40 mass % or less, still more preferably 30 mass % or less. If the phosphorus content in the aluminum phosphate exceeds 50 mass %, the phosphoric acid volatilizes at the kneading or shaping to accelerate the decomposition of the aliphatic polyester or second polymer and this tends to cause reduction in the mechanical strength. Here, the phosphorus content in the aluminum phosphate means the mass ratio of the phosphorus element occupying in the mass of the entire aluminum phosphate. The phosphorus content can be measured using a fluorescent X ray or the like.

The content of the aluminum phosphate is preferably selected such that the phosphorus content in the resin composition becomes 1 mass % or more based on the entire amount of the resin composition. If the phosphorus content in the resin composition is less than 1 mass %, it tends to be difficult to satisfy both the flame retardance and the mechanical strength (particularly, impact resistant strength). Also, the aluminum phosphate content is preferably selected such that the phosphorus content in the resin composition becomes 20 mass % or less. If the phosphorus content in the resin composition exceeds 20 mass %, a phosphorus-containing gas is generated at the elevation of the temperature in the use environment as well as at the shaping step and depending on the case, the resin composition temperature may excessively elevate.

The resin composition of the exemplary embodiment comprises, as essential components, an aliphatic polyester, a second polymer compound having a glass transition point higher than the glass transition point of the aliphatic polyester, and aluminum phosphate, whereby both the mechanical strength and the flame retardance can be satisfied at a high level and moreover, the heat resistance can be enhanced. Here, the present inventors consider the effect of enhancing the flame retardance to be attributable to the fact that the second polymer compound has a glass transition point higher than the glass transition point of the aliphatic polyester and in turn has low flowability at the kneading as compared with the aliphatic polyester and the dispersibility of the aluminum phosphate in the resin composition is thereby enhanced at the kneading, shaping or the like of the resin composition. More specifically, it is considered as follows. The aliphatic polyester having high flowability becomes liquid, whereas the second polymer compound having low flowability becomes solid or semisolid, and the aliphatic polyester flows to enclose the second polymer compound, so that when the resin composition in such a state is uniaxially stretched at a high temperature and taken up or is subjected to shaping, an incompatible region having an aliphatic polyester phase and a second polymer compound phase is formed in the kneaded product or resin compact. At this time, the aliphatic polyester phase and the second polymer compound phase each is fibrous and a plurality of incompatible regions are formed along a predetermined direction (for example, stretching direction). On the other hand, the aluminum phosphate has a property of preferentially dissolving in the aliphatic polyester phase. Accordingly, the fibrous aliphatic polyester phase containing aluminum phosphate can be continuously formed in the kneaded product or resin compact and the dispersibility of the aluminum phosphate in the kneaded product or resin compact is satisfactorily enhanced, as a result, the flame retardance is enhanced.

Also, assuming that the mass of the aliphatic polyester is A and the mass of the second polymer compound is B, the ratio A/B between these two components is preferably from 0.3 to 1.1, more preferably from 0.5 to 0.9. If A/B is less than 0.3, in the above-described incompatible region having fibrous aliphatic polyester phase and second polymer compound phase, the aliphatic polyester phase can be hardly formed as a continuous phase but becomes an intermittent phase and this gives rise to insufficient dispersibility of the aluminum phosphate contained in the aliphatic polyester phase, as a result, the flame retardance tends to decrease. Furthermore, the aluminum phosphate aggregates in a narrow region to readily cause formation of a spatial defect in that region and the mechanical strength is liable to decrease. On the other hand, if A/B exceeds 1.1, the area of the aliphatic polyester becomes too large as compared with the second polymer compound phase to make difficult the formation of an incompatible region where these two phases are fibrous, and this gives rise to insufficient dispersibility of the aluminum phosphate, as a result, the flame retardance tends to decrease. In this case, the mechanical strength of the aliphatic polyester is readily reflected on the mechanical strength of the resin composition, and the mechanical strength of the resin composition tends to decrease.

The resin composition of this embodiment has excellent properties as described above and is useful in that the content of the flame retardant can be reduced while maintaining the flame retardance at a high level. For example, in the case of a resin composition not having the above-described construction, a flame retardant must be contained in a large amount (for example, about 30 mass %) so as to achieve UL-V2 in the flame retardance test, but according to this embodiment, UL-V2 can be achieved even when the content of aluminum phosphate is reduced to about 3 mass %.

The resin composition of the exemplary embodiment may further contain a flame retardant other than the aluminum phosphate (hereinafter, for the sake of convenience, referred to as "the other flame retardant") as long as the effects do not (I-1)

(I-2)

become impaired. Example of the other flame retardant include a phosphorus-based flame retardant except for the aluminum phosphate, a bromine-based flame retardant, a silicone-based flame retardant and an inorganic particle-based flame retardant. Above all, in view of enhancing the solvent resistance, a compound represented by the following formula (I) is preferred:

(I)

[wherein $Ar^1$ represents a substituted or unsubstituted arylene group, a substituted or unsubstituted biphenylene group, or a substituted or unsubstituted bisphenol-type arylene group, $Ar^2$ and $Ar^3$ each independently represents a substituted or unsubstituted aryl group, and $R^1$ and $R^2$ each independently represents a substituted or unsubstituted alkyl group having a carbon number of 1 to 10, or a substituted or unsubstituted aryl group].

Specific examples of the compound represented by formula (I) include compounds represented by the following structural formulae (I-1) and (I-2). Also, a commercially available product (for example, PX-200, produced by Daihachi Chemical Industry Co., Ltd.) may be used as the compound represented by the following structural formula (I-1). Similarly, a commercially available product (for example, CR-741, produced by Daihachi Chemical Industry Co., Ltd.) may be used as the compound represented by the following structural formula (I-2).

From the standpoint of satisfying both the flame retardance and the mechanical strength, the content of the other flame retardant is preferably 10 mass % or less, more preferably 5 mass % or less, based on the entire amount of the resin composition, and is preferably from 5 to 50 mass %, more preferably from 10 to 40 mass %, based on the aluminum phosphate.

The resin composition of the exemplary embodiment may comprise only an aliphatic polyester, a second polymer compound and aluminum phosphate but preferably further contains an elastomer such as elastomer having a core/shell structure with a core and a shell, elastomer having a structure without a shell, and elastomer having a branched structure with a side chain (hereinafter, sometimes collectively and simply referred to as an "elastomer"), because both the mechanical strength and the flame retardance can be satisfied at a higher level and particularly, the impact resistant strength can be more enhanced. Examples of the core of the elastomer having a core/shell structure include butadiene, styrene, methyl methacrylate, acrylonitrile and vinyl acetate. Examples of the shell include alkyl acrylate, alkyl methacrylate and polysiloxane. These may be appropriately selected in accordance with the kind of the aliphatic polyester or second polymer compound. The modification of the core in the elastomer having a core/shell structure may be performed by graft polymerization or may be performed by dipping the core in a solution prepared by dissolving the shell material in a solvent. The average particle diameter of the elastomer is preferably from 0.5 to 50 μm, more preferably from 2 to 20 μm. If the average particle diameter of the elastomer is less than 0.5 μm, the effect of enhancing the impact resistant strength tends to be insufficient, whereas if it exceeds 50 μm, the dispersibility of the elastomer in the resin composition is liable to decrease, and incorporation of the elastomer into the resin composition sometimes rather deteriorates the impact resistant strength.

The resin composition of the exemplary embodiment may further contain, if desired, an additive such as filler, antioxidant, reinforcing agent, compatibilizer, weathering agent, toughening agent and antihydrolysis agent, and a catalyst. The content of each of these additives and catalyst is preferably 10 mass % or less based on the entire amount of the resin compact.

The filler is preferably a filler having an aspect ratio of 3 to 20. Specifically, a natural filler having an aspect ratio of 3 to 20, such as kenaf, bamboo fiber, mica, walnut shell and coffee husk, is suitable. When a filler having an aspect ratio of 3 to 20 is used, the Rockwell hardness and surface impact strength can be enhanced while satisfying both the mechanical strength and the flame retardance. The present inventors consider that this effect is achieved because when the weight average molecular weight of the second polymer compound is smaller than the weight average molecular weight of the aliphatic polyester, the filler having an aspect ratio of 3 to 20 crystallizes the aliphatic polyester and the second polymer compound encompasses the needle-like crystallization product.

Other preferred examples of the filler include at least one member selected from carbon nanotube and fullerene. When carbon nanotube or fullerene is used, the hydrolysis resistance can be enhanced while satisfying both the mechanical strength and the flame retardance. The present inventors consider that this effect is achieved because the carbon nanotube or fullerene reacts with the terminal groups of the aliphatic polyester, second polymer compound and aluminum phosphate.

From the standpoint of satisfying both the mechanical strength and the flame retardance at a higher level, particularly, more enhancing the impact resistance strength, the resin composition of this embodiment preferably contains an antihydrolysis agent. The antihydrolysis agent includes a compound having reactivity with active hydrogen in the resin composition, and specific examples thereof include a carbodiimide compound, an isocyanate compound such as diisocyanate and triisocyanate, a polyfunctional hydroxy compound such as hydroxy compound and dihydroxy compound, a polyfunctional carboxylic acid and its ester derivative, such as dicarboxylic acid and tricarboxylic acid, a polyfunctional amine compound such as diamine and triamine, and an oxazoline-based compound. Among these, a carbodimide compound and an isocyanate compound are preferred in view of enhancing the humidity-heat resistance property. Furthermore, a carbodiimide compound can be melt-kneaded with a resin such as aliphatic polyester, and this is preferred in that a sufficiently high effect of preventing hydrolysis is obtained by the addition in a small amount.

The resin composition of this embodiment is preferably a resin composition giving a resin compact having a Charpy impact resistant strength of 2.5 kJ/m$^2$ or more. The Charpy impact resistant strength as used herein means a value determined by the method in accordance with the ISO-179 standard. The resin composition of this embodiment ensuring a Charpy impact resistant strength of 2.5 kJ/m$^2$ or more is suitable particularly when a resin compact for a casing or the like of electronic equipment is formed.

(Resin Compact and Production Method Thereof)

The resin compact according to the second exemplary embodiment of the present invention comprises the resin composition of the first exemplary embodiment. Incidentally, the constituent components of the resin compact of the second exemplary embodiment are the same as the constituent components of the resin composition of the first exemplary embodiment, and repeated description thereof is omitted here.

The production method of the resin compact of the exemplary embodiment is not particularly limited, and examples thereof include injection molding, injection compression molding, extrusion molding, blow molding, calender molding, coating, casting and dip-coating. Among these, in view of reducing the amount of the solvent used, injection molding and injection compression molding are preferred.

In the production method of the resin compact of the exemplary embodiment, the resin composition is preferably thoroughly mixed before subjecting the resin composition to shaping. In the case of producing the resin compact by injection molding, the resin composition of the first exemplary embodiment or the constituent components may be charged as a pellet-shaped compound into the injection molding machine, or the resin composition or constituent components may be kneaded and directly injection-molded. The shaping conditions are not particularly limited as long as the effect by the use of the resin composition of the first exemplary embodiment is obtained, but for example, in the case of injection molding, the conditions are preferably set such that the temperature of the resin composition in the injection molding machine becomes 230° C. or less, more preferably from 185 to 215° C., because the incompatible region having fibrous aliphatic polyester phase and second polymer compound can be effectively formed.

The resin compact of the second exemplary embodiment may be applied to versatile usage. Specific examples of the usage of the resin compact include an electric/electronic part, a casing thereof, an automobile part, a building material such as wallpaper and exterior material, tableware, a sheet, a buffer and a fiber. Among these, an electronic equipment part and a casing are preferred, because these are required to have high impact resistant strength, high flame retardance and excellent hydrolysis resistance and used in a large amount and high effect of reducing the environmental load is ensured. The casing as used herein means a casing of home electric appliances, containers, electronic equipment and the like. In particular, an electronic equipment casing is suitable because excellent weather resistance is required.

In the case of constructing a casing by using the resin compact of the exemplary embodiment, the casing as a whole may be constructed by the resin compact of the exemplary embodiment, but the portion requiring the performance such as surface impact strength is preferably constructed by the resin compact of the exemplary embodiment. In this case, the portion except for the above-described portion may be constructed by a resin compact other than the resin compact of the exemplary embodiment. More specifically, in the exterior of a printer, a copying machine, a facsimile and the like, the outer member of a front cover, a rear cover, a paper feed tray, a paper discharge tray, a platen, an outlet and the like, and the inner member of an outlet and the like are preferably constructed by the resin compact of the exemplary embodiment. On the other hand, the interior cover, toner cartridge, process cartridge and the like may be constructed by either the resin compact of the exemplary embodiment or another resin compact.

Figure 1:
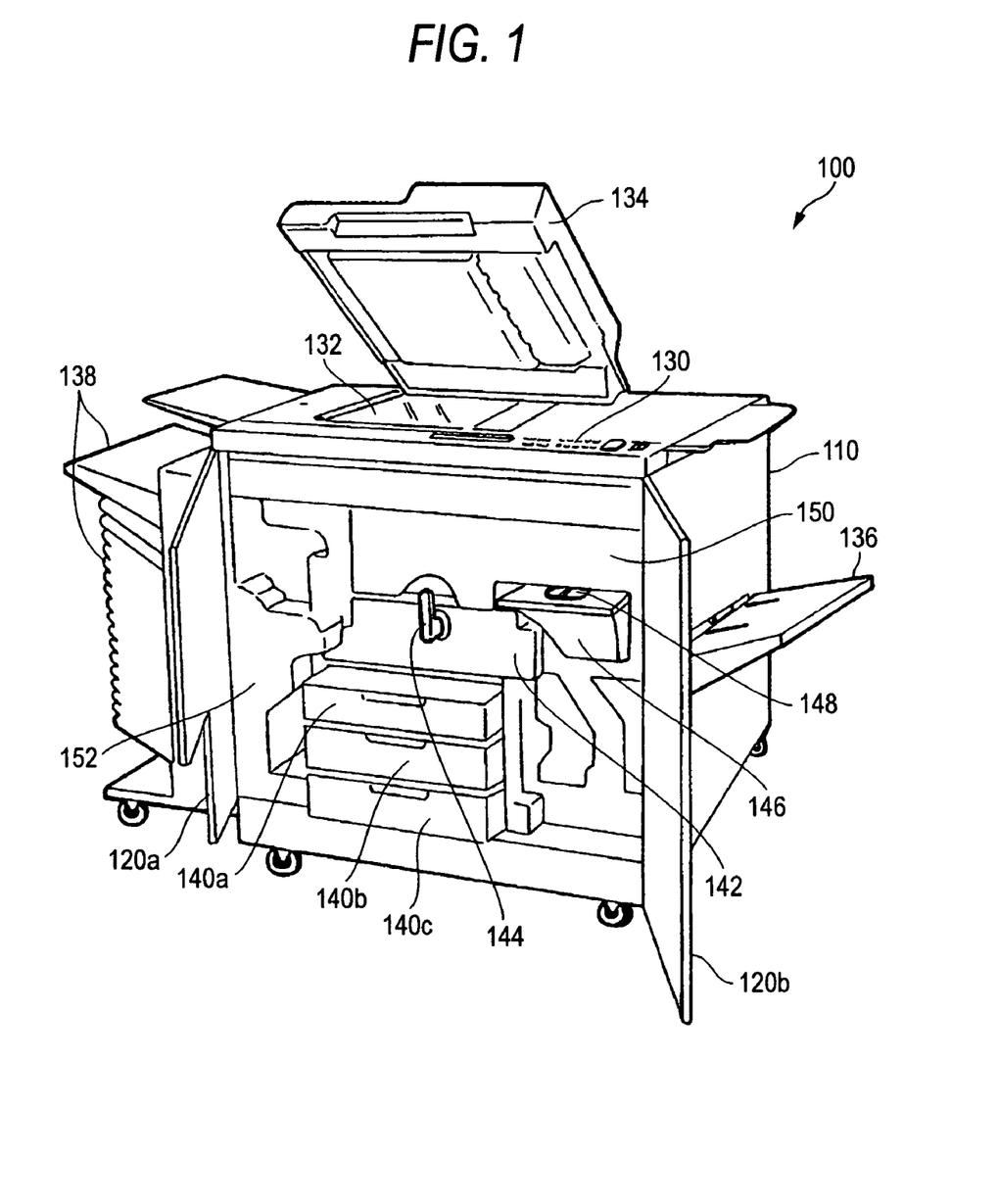
FIG. 1 illustrates an outer appearance perspective view showing an image forming apparatus comprising a casing according to one exemplary embodiment of the resin compact of the present invention.

FIG. 1 is a view showing one exemplary example of an image forming apparatus comprising a casing and equipment parts each constructed using the resin compact of the exemplary embodiment and is an outer appearance perspective view when the image forming apparatus is seen from the front side. In FIG. 1, the image forming apparatus 100 comprises front covers 120*a* and 120*b* at the front of a main body apparatus 110. These front covers 120a and 120b are open/closable so that an operator can operate the inside of the apparatus. By virtue of this construction, the operator can replenish a toner when a toner is consumed, replace the wasted process cartridge, or remove the jammed paper on occurrence of paper jamming in the apparatus. FIG. 1 shows the apparatus in the state of the front covers 120a and 120b being opened.

On the top of the main body apparatus 110, an operation panel 130 into which various conditions concerning the image formation, such as paper size and number of sheets, are input through the operation by an operator, and a copy glass 132 on which the original to be read is placed, are provided. The main body apparatus 110 also comprises, at the upper part thereof, an automatic original conveying device 134 capable of automatically conveying the original onto the copy glass 132. Furthermore, the main body apparatus 110 comprises an image reading device for scanning the original image disposed on the copy glass 132 and obtaining image data representing the original image. The image data obtained by this image reading device are sent to an image forming unit through a control part. The image reading device and the control part are housed inside a casing 150 constituting a part of the main body apparatus 110. Also, the image forming unit is provided in the casing 150 as a removable process cartridge 142. The process cartridge 142 can be loaded or removed by turning an operation lever 144.

In the casing 150 of the main body apparatus 110, a toner housing part 146 is fixed, and a toner can be replenished from a toner supply port 148. The toner housed in the toner housing part 146 is fed to a developing device.

In the lower part of the main body apparatus 110, paper housing cassettes 140a, 140b and 140c are provided. Also, in the main body apparatus 110, a plurality of conveying rollers each composed of a pair of rollers are arrayed in the apparatus, whereby a conveying path allowing the paper in the paper housing cassette to be conveyed to the image forming unit located above the cassette is formed. The paper in each paper housing cassette is taken out one by one by a paper take-out mechanism disposed near the end of the conveying path and delivered to the conveying path. A paper tray 136 for manual feeding is provided on the side surface of the main body apparatus 110, and the paper can be fed also from this tray.

The paper on which an image is formed by the image forming unit is sequentially transferred between two fixing rolls abutting against each other and being supported by a casing 152 constituting a part of the main body apparatus 110 and then discharged outside the main body apparatus 110. In the main body apparatus 110, a plurality of discharge trays 138 are provided on the side opposite the side where the paper tray 136 is provided, and the paper after image formation is discharged to these trays.

In the image forming apparatus 100, the front covers 120a and 120b are often subject to a load such as stress and impact at the opening/closing, vibration during image formation, and heat generated inside the image forming apparatus. The process cartridge 142 is often subject to a load such as impact at the loading/removal, vibration during image formation, and heat generated inside the image forming apparatus. The casing 150 and the casing 152 are often subject to a load such as vibration during image formation and heat generated inside the image forming apparatus. Therefore, the resin compact of the exemplary embodiment is suitably used as the front covers 120a and 120b of the image forming apparatus 100, the exterior of the process cartridge 142, the casing 150 and the casing 152.

(Recycling Method of Resin Compact)

The recycling method of a resin compact, according to the third exemplary embodiment of the present invention, comprises a grinding step of grinding the resin compact of the second exemplary embodiment, a heating step of heating the ground product obtained in the grinding step at a temperature lower than the melting point of the aliphatic polyester, and a shaping step of shaping the ground product after the heating step to obtain a resin compact.

In the grinding step, the method for grinding the resin compact is not particularly limited but is suitably freeze-grinding in view of capability of grinding while sufficiently suppressing the damage of the above-described incompatible region having fibrous aliphatic polyester phase and second polymer phase. The size of the resin compact after grinding is preferably from 0.5 to 7 mm in terms of the average particle diameter.

In the heating step, the temperature at the time of heating the ground product obtained in the grinding step is, as described above, a temperature lower than the melting point of the aliphatic polyester and is preferably 180° C. or less, more preferably from 100 to 160° C. By virtue of passing through the heating step under the condition above, crystallization of the aliphatic polyester phase is accelerated and this is preferred in view of self-repairing or maintenance of the mechanical strength. Furthermore, the ground product after the heating step is liable to become rounded pellets and can be satisfactorily prevented from biting with a screw or a tooth in an injection molding machine or the like, and this is preferred also in view of production efficiency.

As for the shaping method in the shaping step, various shaping methods set forth as examples in the production method of the resin compact of the second exemplary embodiment may be applied, but the shaping step is preferably a step of injection-molding the ground product after the heating step to obtain a resin compact.

The shaping conditions in the shaping step are not particularly limited as long as the properties of the resin compact as a raw material of the recycling can be satisfactorily maintained in the resin compact after regeneration, but, for example, in the case of injection molding, the injection temperature is preferably from 170 to 230° C., the die temperature is preferably from 20 to 100° C. and the cooling time is preferably from 5 to 120 seconds.

EXAMPLES

The present invention is described in greater detail below by referring to Examples and Comparative Examples, but the present invention is not limited to these Examples.

Examples 1 to 22 and Comparative Examples 1 to 3

In Examples 1 to 19 and Comparative Examples 1 to 3, the raw materials shown in Tables 1 to 6 are charged into a twin-screw kneader (TEM58SS, manufactured by Toshiba Machine Co., Ltd.) and kneaded at a cylinder temperature of 220° C. to obtain a resin composition (compound). The obtained resin composition is injection molded by an injection molding apparatus (NEX150E, manufactured by Nissei Plastic Industrial Co., Ltd.) at a cylinder temperature of 220° C. and a die temperature of 30° C., whereby an ISO multipurpose specimen (compliant with the ISO527 tensile test and ISO178 flex test, thickness of test part: 4 mm, width: 10 mm) and a UL94V test specimen (two kinds of specimens having a thickness of 0.8 mm and 1.6 mm) are obtained. In Examples 20 to 22, specimens are produced in the same manner as in Examples 1 to 3 except for changing the cylinder temperature to 230° C. and the die temperature to 30° C. at the injection molding of an ISO multipurpose specimen and a UL94V test specimen. Incidentally, as for the aliphatic polyester used in the composition in Examples, the weight average molecular weight of LACEA H-100 (produced by Mitsui Chemicals Inc.) is 45,000 and that of Terramac TE4000 (produced by Unitika Ltd.) is 60,000.

Subsequently, an ISO multipurpose dumbbell specimen is fabricated, and the Charpy impact resistant strength according to ISO179 and the thermal deformation temperature according to ISO75 each is measured. At the measurement of the thermal deformation temperature, two kinds of conditions using a load of 0.45 MPa and 1.80 MPa are set. Also, a UL-V test is performed using the UL94V test specimen according to the UL-94 method. The results obtained are shown in Tables 1 to 6.

Figure 2:
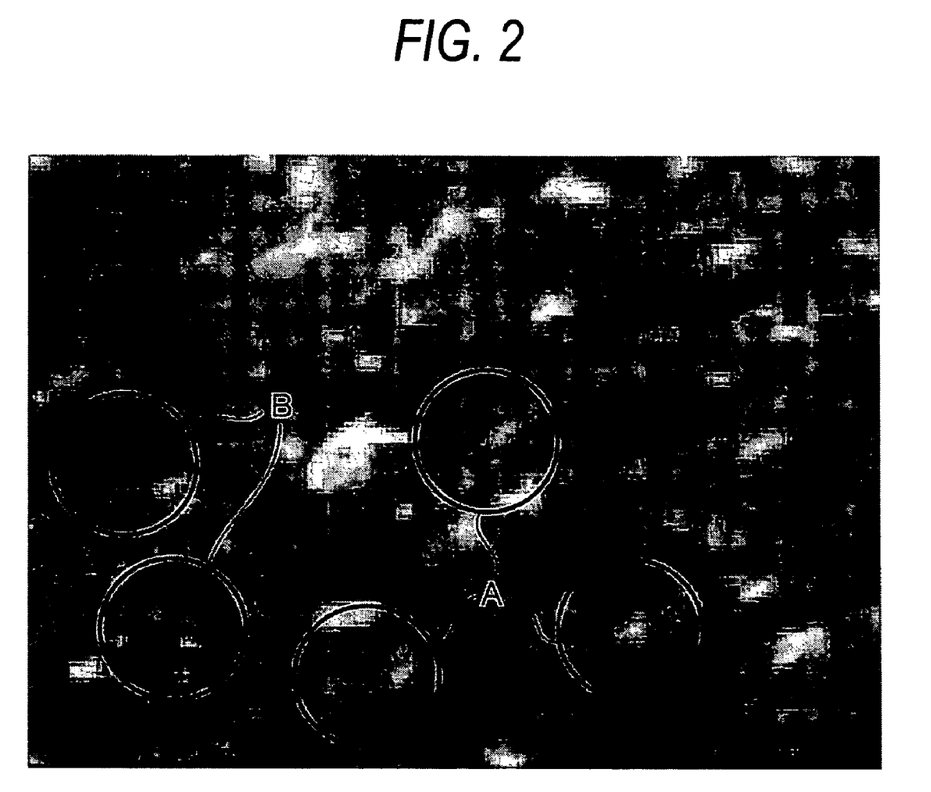
FIG. 2 illustrates a figure of a micrograph showing the fracture cross-section of the resin compact (ISO multipurpose specimen) obtained in Example 1.

The fracture cross-section of the ISO multipurpose specimen obtained in Example 1 is observed at a magnification of 7,500 times through a tunnel electron microscope (TEM) (H-7500, manufactured by Hitachi, Ltd.). FIG. 2 shows a figure of the obtained micrograph. As seen in FIG. 2, formation of an incompatible region having fibrous aliphatic polyester phase (polylactic acid phase, white portions present in the region A of FIG. 2) and second polymer compound phase (polycarbonate phase, black portions present in the region B of FIG. 2) is confirmed.

TABLE 1

|  |  | Example 1 | Example 2 | Example 3 | Example 4 |
|---|---|---|---|---|---|
| Formulation of Resin Composition (parts by mass) | Aliphatic Polyester A1: polylactic acid (LACEA H-100, produced by Mitsui Chemicals Inc., glass transition point: 56° C.) | 36 | 27 | 45 | 34 |
|  | Aliphatic Polyester A2: poly(3-hydroxybutyric acid) (Terramac TE4000, produced by Unitika Ltd., glass transition point: 48° C.) | — | — | — | — |
|  | Second Polymer Compound B1: polycarbonate (Panlite L1225Y, produced by Teijin Chemicals Ltd., glass transition point: 140° C.) | 54 | 63 | 45 | 51 |
|  | Second Polymer Compound B2: ABS resin (Kuralastic GA704, produced by UMG, glass transition point: 80° C.) | — | — | — | — |
|  | Aluminum phosphate (OP-930, produced by Clariant, phosphorus content: 23 mass %) | 10 | 10 | 10 | 15 |
|  | Aluminum phosphate (OP-1312, produced by Clariant, phosphorus content: 18 mass %) | — | — | — | — |
|  | Condensed phosphoric acid ester (PX-200, produced by Daihachi Chemical Industry Co., Ltd., phosphorus content: 9 mass %) | — | — | — | — |
|  | Butadiene-acryl elastomer (METABLEN C233A, produced by Mitsubishi Rayon Co., Ltd.) | — | — | — | — |
|  | Antihydrolysis agent (Carbodilite LA-1, produced by Nisshinbo Industries, Inc.) | — | — | — | — |
|  | Weathering agent (ADK STAB LA-29, produced by ADEKA Corp.) | — | — | — | — |
|  | Carbon black (TOKABLACK #8500/F, produced by Tokai Carbon Co., Ltd.) | — | — | — | — |
|  | Titanium oxide (TU382, produced by Toyo Ink Mfg. Co., Ltd.) | — | — | — | — |
| Ratio A/B of mass A of aliphatic polyester and mass B of second polymer compound | | 0.67 | 0.43 | 1.00 | 0.67 |
| Biobased content (mass %) | | 36 | 27 | 45 | 34 |
| Charpy impact resistant strength (notched, kJ/m$^2$) | | 10.1 | 10.3 | 9.9 | 2.5 |
| Thermal deformation temperature | 0.45 MPa | 121 | 123 | 118 | 115 |
|  | 1.80 MPa | 67 | 92 | 72 | 82 |
| Flame retardance (UL-V test) | 0.8 mm | V-2 | V-2 | V-2 | V-1 |
|  | 1.6 mm | V-2 | V-2 | V-2 | V-1 |

TABLE 2

|  |  | Example 5 | Example 6 | Example 7 | Example 8 |
|---|---|---|---|---|---|
| Formulation of Resin Composition (parts by mass) | Aliphatic Polyester A1: polylactic acid (LACEA H-100, produced by Mitsui Chemicals Inc., glass transition point: 56° C.) | 21.5 | 43 | 29.4 | 30.4 |
|  | Aliphatic Polyester A2: poly(3-hydroxybutyric acid) (Terramac TE4000, produced by Unitika Ltd., glass transition point: 48° C.) | — | — | — | — |
|  | Second Polymer Compound B1: polycarbonate (Panlite L1225Y, produced by | 63.5 | 42 | 44.1 | 45.6 |

TABLE 2-continued

|  |  | Example | | | |
|---|---|---|---|---|---|
|  |  | 5 | 6 | 7 | 8 |
|  | Teijin Chemicals Ltd., glass transition point: 140° C.) | | | | |
|  | Second Polymer Compound B2: ABS resin (Kuralastic GA704, produced by UMG, glass transition point: 80° C.) | — | — | — | — |
|  | Aluminum phosphate (OP-930, produced by Clariant, phosphorus content: 23 mass %) | 15 | 15 | 15 | 15 |
|  | Aluminum phosphate (OP-1312, produced by Clariant, phosphorus content: 18 mass %) | — | — | — | — |
|  | Condensed phosphoric acid ester (PX-200, produced by Daihachi Chemical Industry Co., Ltd., phosphorus content: 9 mass %) | — | — | — | — |
|  | Butadiene-acryl elastomer (METABLEN C233A, produced by Mitsubishi Rayon Co., Ltd.) | — | — | 7.5 | 5 |
|  | Antihydrolysis agent (Carbodilite LA-1, produced by Nisshinbo Industries, Inc.) | — | — | 1 | 1 |
|  | Weathering agent (ADK STAB LA-29, produced by ADEKA Corp.) | — | — | 1 | 1 |
|  | Carbon black (TOKABLACK #8500/F, produced by Tokai Carbon Co., Ltd.) | — | — | — | 2 |
|  | Carbon nanotube (produced by Frontier Carbon Corp.) | — | — | 2 | — |
|  | Titanium oxide (TU382, produced by Toyo Ink Mfg. Co., Ltd.) | — | — | — | — |
| Ratio A/B of mass A of aliphatic polyester and mass B of second polymer compound | | 0.34 | 1.02 | 0.67 | 0.67 |
| Biobased content (mass %) | | 21.5 | 43 | 29.4 | 30.4 |
| Charpy impact resistant strength (notched, kJ/m$^2$) | | 4.3 | 2.5 | 3.6 | 3.4 |
| Thermal deformation temperature | 0.45 MPa | 117 | 114 | 113 | 118 |
|  | 1.80 MPa | 90 | 78 | 83 | 85 |
| Flame retardance | 0.8 mm | V-2 | V-2 | V-1 | V-0 |
| (UL-V test) | 1.6 mm | V-2 | V-2 | V-0 | V-0 |

TABLE 3

|  |  | Example | | | |
|---|---|---|---|---|---|
|  |  | 9 | 10 | 11 | 12 |
| Formulation of Resin Composition (parts by mass) | Aliphatic Polyester A1: polylactic acid (LACEA H-100, produced by Mitsui Chemicals Inc., glass transition point: 56° C.) | 32.4 | 30 | 31 | 33 |
|  | Aliphatic Polyester A2: poly(3-hydroxybutyric acid) (Terramac TE4000, produced by Unitika Ltd., glass transition point: 48° C.) | — | — | — | — |
|  | Second Polymer Compound B1: polycarbonate (Panlite L1225Y, produced by Teijin Chemicals Ltd., glass transition point: 140° C.) | 48.6 | 45.1 | 46.6 | 49.6 |
|  | Second Polymer Compound B2: ABS resin (Kuralastic GA704, produced by UMG, glass transition point: 80° C.) | — | — | — | — |
|  | Aluminum phosphate (OP-930, produced by Clariant, phosphorus content: 23 mass %) | 10 | 15 | 15 | 15 |
|  | Aluminum phosphate (OP-1312, produced by Clariant, phosphorus content: 18 mass %) | — | — | — | — |
|  | Condensed phosphoric acid ester (PX-200, produced by Daihachi Chemical Industry Co., Ltd., phosphorus content: 9 mass %) | — | — | — | — |
|  | Butadiene-acryl elastomer (METABLEN C233A, produced by Mitsubishi Rayon Co., Ltd.) | 5 | 7.5 | 5 | 5 |
|  | Antihydrolysis agent (Carbodilite LA-1, produced by Nisshinbo Industries, Inc.) | 1 | 1 | 1 | 1 |
|  | Weathering agent (ADK STAB LA-29, produced by ADEKA Corp.) | 1 | 1 | 1 | 1 |
|  | Carbon black (TOKABLACK #8500/F, produced by Tokai Carbon Co., Ltd.) | 2 | — | — | — |
|  | Titanium oxide (TU382, produced by Toyo Ink Mfg. Co., Ltd.) | — | 0.4 | 0.4 | 0.4 |

TABLE 3-continued

|  |  | Example |  |  |  |
|---|---|---|---|---|---|
|  |  | 9 | 10 | 11 | 12 |
| Ratio A/B of mass A of aliphatic polyester and mass B of second polymer compound |  | 0.67 | 0.67 | 0.67 | 0.67 |
| Biobased content (mass %) |  | 35.6 | 30 | 31 | 33 |
| Charpy impact resistant strength (notched, kJ/m$^2$) |  | 4.8 | 4 | 4.4 | 5 |
| Thermal deformation temperature | 0.45 MPa | 120 | 115 | 116 | 117 |
|  | 1.80 MPa | 86 | 78 | 78 | 80 |
| Flame retardance | 0.8 mm | V-0 | V-2 | V-2 | V-2 |
| (UL-V test) | 1.6 mm | V-0 | V-2 | V-2 | V-2 |

TABLE 4

|  |  | Example |  |  |  |  |
|---|---|---|---|---|---|---|
|  |  | 13 | 14 | 15 | 16 | 17 |
| Formulation of Resin Composition (parts by mass) | Aliphatic Polyester A1: polylactic acid (LACEA H-100, produced by Mitsui Chemicals Inc., glass transition point: 56° C.) | 29.8 | 30.6 | — | 29.4 | 43.2 |
|  | Aliphatic Polyester A2: poly(3-hydroxybutyric acid) (Terramac TE4000, produced by Unitika Ltd., glass transition point: 48° C.) | — | — | 29.4 | — | — |
|  | Second Polymer Compound B1: polycarbonate (Panlite L1225Y, produced by Teijin Chemicals Ltd., glass transition point: 140° C.) | 44.7 | 45.9 | 44.1 | — | 38.3 |
|  | Second Polymer Compound B2: ABS resin (Kuralastic GA704, produced by UMG, glass transition point: 80° C.) | — | — | — | 44.1 | — |
|  | Aluminum phosphate (OP-930, produced by Clariant, phosphorus content: 23 mass %) | 15 | 15 | 15 | 15 | 10 |
|  | Aluminum phosphate (OP-1312, produced by Clariant, phosphorus content: 18 mass %) | — | — | — | — | — |
|  | Condensed phosphoric acid ester (PX-200, produced by Daihachi Chemical Industry Co., Ltd., phosphorus content: 9 mass %) | — | — | — | — | — |
|  | Butadiene-acryl elastomer (METABLEN C233A, produced by Mitsubishi Rayon Co., Ltd.) | 7.5 | 7.5 | 7.5 | 7.5 | 7.5 |
|  | Antihydrolysis agent (Carbodilite LA-1, produced by Nisshinbo Industries, Inc.) | 1 | 1 | 1 | 1 | 1 |
|  | Weathering agent (ADK STAB LA-29, produced by ADEKA Corp.) | 1 | 1 | 1 | 1 | — |
|  | Carbon nanotube (produced by Frontier Carbon Corp.) | 2 | — | — | — | — |
|  | Fullerene (C60, produced by Frontier Carbon Corp.) | — | — | 2 | 2 | — |
|  | Titanium oxide (TU382, produced by Toyo Ink Mfg. Co., Ltd.) | — | — | — | — | — |
| Ratio A/B of mass A of aliphatic polyester and mass B of second polymer compound |  | 0.67 | 0.67 | 0.67 | 0.67 | 1.13 |
| Biobased content (mass %) |  | 29.8 | 30.6 | 29.4 | 29.4 | 43.2 |
| Charpy impact resistant strength (notched, kJ/m$^2$) |  | 7.4 | 7.5 | 4.5 | 4.8 | 4 |
| Thermal deformation temperature | 0.45 MPa | 120 | 122 | 107 | 95 | 85 |
|  | 1.80 MPa | 75 | 72 | 69 | 69 | 60 |
| Flame retardance | 0.8 mm | V-1 | V-2 | V-1 | V-1 | V-2 |
| (UL-V test) | 1.6 mm | V-0 | V-2 | V-0 | V-0 | V-2 |

TABLE 5

|  |  | Example |  |  |  |  |
|---|---|---|---|---|---|---|
|  |  | 18 | 19 | 20 | 21 | 22 |
| Formulation of Resin Composition (parts by mass) | Aliphatic Polyester A1: polylactic acid (LACEA H-100, produced by Mitsui Chemicals Inc., glass transition point: 56° C.) | 20.2 | 47.3 | 36 | 27 | 45 |
|  | Aliphatic Polyester A2: poly(3-hydroxybutyric acid) (Terramac TE4000, produced by Unitika Ltd., glass transition point: 48° C.) | — | — | — | — | — |
|  | Second Polymer Compound B1: | 69.8 | 42.7 | 54 | 63 | 45 |

TABLE 5-continued

|  |  | Example | | | | |
|---|---|---|---|---|---|---|
|  |  | 18 | 19 | 20 | 21 | 22 |
| | polycarbonate (Panlite L1225Y, produced by Teijin Chemicals Ltd., glass transition point: 140° C.) | | | | | |
| | Second Polymer Compound B2: ABS resin (Kuralastic GA704, produced by UMG, glass transition point: 80° C.) | — | — | — | — | — |
| | Aluminum phosphate (OP-930, produced by Clariant, phosphorus content: 23 mass %) | 10 | 10 | 10 | 10 | 10 |
| | Aluminum phosphate (OP-1312, produced by Clariant, phosphorus content: 18 mass %) | — | — | — | — | — |
| | Condensed phosphoric acid ester (PX-200, produced by Daihachi Chemical Industry Co., Ltd., phosphorus content: 9 mass %) | — | — | — | — | — |
| | Butadiene-acryl elastomer (METABLEN C233A, produced by Mitsubishi Rayon Co., Ltd.) | — | — | — | — | — |
| | Antihydrolysis agent (Carbodilite LA-1, produced by Nisshinbo Industries, Inc.) | — | — | — | — | — |
| | Weathering agent (ADK STAB LA-29, produced by ADEKA Corp.) | — | — | — | — | — |
| | Carbon black (TOKABLACK #8500/F, produced by Tokai Carbon Co., Ltd.) | — | — | — | — | — |
| | Titanium oxide (TU382, produced by Toyo Ink Mfg. Co., Ltd.) | — | — | — | — | — |
| Ratio A/B of mass A of aliphatic polyester and mass B of second polymer compound | | 0.29 | 1.11 | 0.67 | 0.43 | 1.00 |
| Biobased content (mass %) | | 20.2 | 47.3 | 36 | 27 | 45 |
| Charpy impact resistant strength (notched, kJ/m$^2$) | | 5.8 | 4 | 7 | 7.2 | 7.5 |
| Thermal deformation temperature | 0.45 MPa | 72 | 65 | 67 | 67 | 63 |
| | 1.80 MPa | 65 | 62 | 70 | 72 | 68 |
| Flame retardance | 0.8 mm | V-2 | V-2 | V-2 | V-2 | V-2 |
| (UL-V test) | 1.6 mm | V-2 | V-2 | V-2 | V-2 | V-2 |

TABLE 6

|  |  | Comparative Example | | |
|---|---|---|---|---|
|  |  | 1 | 2 | 3 |
| Formulation of Resin Composition (parts by mass) | Aliphatic Polyester A1: polylactic acid (LACEA H-100, produced by Mitsui Chemicals Inc., glass transition point: 56° C.) | — | 80.5 | 28.2 |
| | Aliphatic Polyester A2: poly(3-hydroxybutyric acid) (Terramac TE4000, produced by Unitika Ltd., glass transition point: 48° C.) | — | — | — |
| | Second Polymer Compound B1: polycarbonate (Panlite L1225Y, produced by Teijin Chemicals Ltd., glass transition point: 140° C.) | 80.5 | — | 42.3 |
| | Second Polymer Compound B2: ABS resin (Kuralastic GA704, produced by UMG, glass transition point: 80° C.) | — | — | — |
| | Aluminum phosphate (OP-930, produced by Clariant, phosphorus content: 23 mass %) | 10 | 10 | — |
| | Aluminum phosphate (OP-1312, produced by Clariant, phosphorus content: 18 mass %) | — | — | — |
| | Condensed phosphoric acid ester (PX-200, produced by Daihachi Chemical Industry Co., Ltd., phosphorus content: 9 mass %) | — | — | 20 |
| | Butadiene-acryl elastomer (METABLEN C233A, produced by Mitsubishi Rayon Co., Ltd.) | 7.5 | 7.5 | 7.5 |
| | Antihydrolysis agent (Carbodilite LA-1, produced by Nisshinbo Industries, Inc.) | 1 | 1 | 1 |
| | Weathering agent (ADK STAB LA-29, produced by ADEKA Corp.) | 1 | 1 | 1 |
| | Carbon black (TOKABLACK #8500/F, produced by Tokai Carbon Co., Ltd.) | — | — | 1 |
| | Titanium oxide (TU382, produced by Toyo Ink Mfg. Co., Ltd.) | — | — | — |

TABLE 6-continued

|  |  | Comparative Example | | |
|---|---|---|---|---|
|  |  | 1 | 2 | 3 |
| Ratio A/B of mass A of aliphatic polyester and mass B of second polymer compound | | 0 | — | 0.67 |
| Biobased content (mass %) | | 0 | 80.5 | 28.2 |
| Charpy impact resistant strength (notched, kJ/m²) | | 5.8 | 0.5 | 1.5 |
| Thermal deformation temperature | 0.45 MPa | 125 | 54 | 85 |
|  | 1.80 MPa | 115 | 52 | 65 |
| Flame retardance | 0.8 mm | V-1 | V-2 | V-1 |
| (UL-V test) | 1.6 mm | V-0 | V-2 | V-0 |

Examples 23 to 43 and Comparative Examples 4 to 6

In Examples 18 to 34 and Comparative Examples 4 to 6, injection molding is performed in an injection molding apparatus (NEX150E, manufactured by Nissei Plastic Industrial Co., Ltd.) by using the resin compositions of Examples 1 to 22 and Comparative Examples 1 to 3, respectively, in such a correspondence relationship that Example 23 is the resin composition of Example 1 and Example 24 is the resin composition of Example 2, whereby the outlet inner member and outlet outer member as interior parts of a color complex machine are produced. At the production of the outlet inner member, the shaping conditions are set to a cylinder temperature of 220° C. and a die temperature of 40° C., and at the production of the outlet outer member, the shaping conditions are set to a cylinder temperature of 210° C. and a die temperature of 30° C. In all cases, the shapes and dimensions of the outlet inner member and outlet outer member are made the same as those of the outlet inner member and outlet outer member of the color copying machine Apeos 450 manufactured by Fuji Xerox Co., Ltd.

As for the outlet inner member, the number of short compacts (a compact when the resin composition is not filled throughout the die) out of 100 units which are continuously shaped, is counted. Also, the outlet inner member is subjected to a notching process by the method of ISO178, and the Charpy impact resistant strength of each of the portion with a weld and the potion without a weld is measured. In addition, a UV-V test is performed by the method of UL-94 and the flame retardance of the outlet inner member is evaluated.

Furthermore, the outlet inner member is freeze ground using a mill cutter and after heating the ground product at 100° C. for 4 hours, injection molding is performed under the same conditions as above to produce an outlet inner member. The grinding, heating and shaping are repeated 5 times, and the Charpy impact resistant strength of the outlet inner member is then measured in the same manner as above to evaluate the recycle property.

As for the outlet outer member, the presence or absence of exterior shrinkage (a state where the resin composition shrinks due to cooling during the shaping and a recess is partially produced; a pattern is sometimes generated on the surface) is observed with an eye. Also, a 1.3 m-long cylindrical body is vertically disposed on the top of the outlet outer member placed on a horizontal table, a steel ball having a diameter of 50 mm and a mass of 500 g is dropped toward the outlet outer member by charging the steel ball from the top end of the cylindrical body, and the presence or absence of cracking in the outlet outer member after the impact with the steel ball is evaluated. The results obtained are shown in Tables 7 to 12. Incidentally, in this test, the evaluation is performed on the outlet outer member not subjected to a pretreatment after the shaping above until the test (see, the column of "Not heat-treated" in Tables 7 to 12) and the outlet outer member heat-treated at 100° C. for 4 hours (see, the column "Heat-treated" in Tables 7 to 12).

TABLE 7

|  |  |  |  | Example | | | |
|---|---|---|---|---|---|---|---|
|  |  |  |  | 23 | 24 | 25 | 26 |
| Outlet inner member | Number of short compacts (units/100 units) | | | 2 | 4 | 3 | 5 |
|  | Charpy impact resistant strength (kJ/m²) | With weld | Initial | 9.5 | 10.2 | 9.8 | 2.6 |
|  |  |  | After regeneration 5 times | 9.3 | 9.9 | 9.6 | 2.6 |
|  |  | Without weld | Initial | 9.9 | 10.5 | 10.1 | 2.8 |
|  |  |  | After regeneration 5 times | 9.8 | 10.2 | 9.9 | 2.8 |
|  | Flame retardance (UL-V test) | | | V-2 | V-2 | V-2 | V-1 |
| Outlet outer member | Presence or absence of exterior shrinkage | | | none | none | none | none |
|  | Steel ball drop test | Presence or absence of cracking | Not heat-treated | none | none | none | none |
|  |  |  | Heat-treated | none | none | none | none |

TABLE 8

|  |  |  |  | Example | | | |
|---|---|---|---|---|---|---|---|
|  |  |  |  | 27 | 28 | 29 | 30 |
| Outlet inner member | Number of short compacts (units/100 units) |  |  | 4 | 3 | 2 | 1 |
|  | Charpy impact resistant strength (kJ/m$^2$) | With weld | Initial | 4.1 | 2.4 | 3.4 | 3.2 |
|  |  |  | After regeneration 5 times | 4.1 | 2.4 | 3.3 | 3.1 |
|  |  | Without weld | Initial | 4.4 | 2.6 | 3.4 | 3.5 |
|  |  |  | After regeneration 5 times | 4.2 | 2.4 | 3.1 | 3.1 |
|  | Flame retardance (UL-V test) |  |  | V-2 | V-2 | V-0 | V-0 |
| Outlet outer member | Presence or absence of exterior shrinkage |  |  | none | none | none | none |
|  | Steel ball drop test | Presence or absence of cracking | Not heat-treated | none | none | none | none |
|  |  |  | Heat-treated | none | none | none | none |

TABLE 9

|  |  |  |  | Example | | | |
|---|---|---|---|---|---|---|---|
|  |  |  |  | 31 | 32 | 33 | 34 |
| Outlet inner member | Number of short compacts (units/100 units) |  |  | 3 | 4 | 2 | 5 |
|  | Charpy impact resistant strength (kJ/m$^2$) | With weld | Initial | 4.9 | 4.3 | 4.4 | 4.4 |
|  |  |  | After regeneration 5 times | 4.5 | 4.1 | 4.1 | 4.2 |
|  |  | Without weld | Initial | 5.2 | 4.4 | 4.6 | 4.8 |
|  |  |  | After regeneration 5 times | 5 | 4.3 | 4.5 | 4.7 |
|  | Flame retardance (UL-V test) |  |  | V-0 | V-2 | V-2 | V-2 |
| Outlet outer member | Presence or absence of exterior shrinkage |  |  | none | none | none | none |
|  | Steel ball drop test | Presence or absence of cracking | Not heat-treated | none | none | none | none |
|  |  |  | Heat-treated | none | none | none | none |

TABLE 10

|  |  |  |  | Example | | | | |
|---|---|---|---|---|---|---|---|---|
|  |  |  |  | 35 | 36 | 37 | 38 | 39 |
| Outlet inner member | Number of short compacts (units/100 units) |  |  | 4 | 4 | 3 | 4 | 3 |
|  | Charpy impact resistant strength (kJ/m$^2$) | With weld | Initial | 7.4 | 7.6 | 4.2 | 4.7 | 4.0 |
|  |  |  | After regeneration 5 times | 7.3 | 7.6 | 4.1 | 4.7 | 4.0 |
|  |  | Without weld | Initial | 7.5 | 7.8 | 4.4 | 4.9 | 4.1 |
|  |  |  | After regeneration 5 times | 7.2 | 7.6 | 4.2 | 4.4 | 4.0 |
|  | Flame retardance (UL-V test) |  |  | V-0 | V-2 | V-0 | V-0 | V-2 |
| Outlet outer member | Presence or absence of exterior shrinkage |  |  | none | none | none | none | none |
|  | Steel ball drop test | Presence or absence of cracking | Not heat-treated | none | none | none | none | none |
|  |  |  | Heat-treated | none | none | none | none | none |

TABLE 11

|  |  |  |  | Example | | | |
|---|---|---|---|---|---|---|---|
|  |  |  |  | 40 | 41 | 42 | 43 |
| Outlet inner member | Number of short compacts (units/100 units) |  |  | 7 | 7 | 3 | 4 |
|  | Charpy impact resistant strength (kJ/m$^2$) | With weld | Initial | 4.2 | 3.8 | 6.8 | 6.9 |
|  |  |  | After regeneration 5 times | 4.1 | 3.7 | 6.6 | 6.8 |
|  |  | Without weld | Initial | 4.8 | 4 | 7.8 | 7.2 |
|  |  |  | After regeneration 5 times | 4.7 | 4 | 7.7 | 7.1 |
|  | Flame retardance (UL-V test) |  |  | V-2 | V-2 | V-2 | V-1 |
| Outlet outer member | Presence or absence of exterior shrinkage |  |  | none | none | none | none |
|  | Steel ball drop test | Presence or absence of cracking | Not heat-treated | none | none | none | none |
|  |  |  | Heat-treated | none | none | none | none |

TABLE 12

|  |  |  |  | Comparative Example | | |
|---|---|---|---|---|---|---|
|  |  |  |  | 4 | 5 | 6 |
| Outlet inner member | Number of short compacts (units/100 units) | | | 25 | 6 | 12 |
|  | Charpy impact resistant strength ($kJ/m^2$) | With weld | Initial | 4.8 | 0.4 | 1.5 |
|  |  |  | After regeneration 5 times | 2.2 | 0.1 | 0.7 |
|  |  | Without weld | Initial | 4.8 | 0.5 | 1.4 |
|  |  |  | After regeneration 5 times | 2.4 | 0.2 | 1.8 |
|  | Flame retardance (UL-V test) | | | V-2 | Not V | Not V |
| Outlet outer member | Presence or absence of exterior shrinkage | | | present | present | present |
|  | Steel ball drop test | Presence or absence of cracking | Not heat-treated | cracked | cracked | cracked |
|  |  |  | Heat-treated | cracked | cracked | cracked |

Example 44

An ISO multipurpose dumbbell specimen and a UL-94V test specimen are obtained in the same manner as in Example 1 except that at the preparation of the resin composition (compound), 2.0 parts by mass of condensed phosphoric acid ester (PX200, produced by Daihachi Chemical Industry Co., Ltd.) is further added to the raw material.

Subsequently, the specimens obtained in Example 1 and Example 44 each is evaluated on the resistance against solvent or oil. Specifically, a solvent or oil shown in Table 11 below is coated on the ISO multipurpose dumbbell specimen, and in an environment of a temperature of 25° C. and a humidity of 55%, a strain of 0.5% is imposed on the center portion of the specimen by applying a pressure from the surface opposite the surface coated with the solvent while fixing both ends of the specimen. After 20 hours, the presence or absence of cracking is evaluated. The results are shown in Table 13.

TABLE 13

|  |  | Example 1 | Example 35 |
|---|---|---|---|
| Presence or absence of cracking | Water | none | none |
|  | Isopropyl alcohol | occurred | none |
|  | Benzene | occurred | none |
|  | Amino-modified oil (KF8009, produced by Shin-Etsu Silicone) | occurred | none |
|  | Mineral oil (Tellus 68, produced by Showa Shell Sekiyu K.K.) | occurred | none |
|  | Press oil (SUNPRESS S304, produced by Sugimura Chemical Industrial Co., Ltd.) | occurred | none |

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The exemplary embodiments are chosen and described in order to best explain the principles of the invention and its practical applications, thereby enabling others skilled in the art to understand the invention for various exemplary embodiments and with the various modifications as are suited to the particular use contemplated. It is intended that the scope of the invention be defined by the following claims and their equivalents.

What is claimed is:

1. A resin composition, comprising:
    an aliphatic polyester;
    a second polymer compound having a glass transition point higher than a glass transition point of the aliphatic polyester;
    aluminum phosphate; and
    an elastomer having a core-shell structure with the core comprising butadiene and the shell comprising acryl.

2. The resin composition according to claim 1, wherein a ratio A/B between a mass A of the aliphatic polyester and a mass B of the second polymer compound is from 0.3 to 1.1.

3. The resin composition according to claim 1, wherein the aliphatic polyester is polylactic acid.

4. The resin composition according to claim 1, wherein the second polymer compound is polycarbonate.

5. A resin compact, comprising the resin composition according to claim 1.

6. The resin compact according to claim 5, comprising a fibrous aliphatic polyester phase.

7. A method for producing a resin compact, comprising:
    injection-molding the resin composition according to claim 1 under a condition of allowing a temperature of the resin composition to become 230° C. or less.

8. A method for recycling a resin compact, comprising:
    grinding the resin compact according to claim 5;
    heating a ground product obtained in the grinding at a temperature lower than a melting point of the aliphatic polyester; and
    shaping the ground product after the heating to obtain a resin compact.

9. The method according to claim 8, wherein the grinding is freeze-grinding the resin compact and the shaping is injection-molding the ground product after the heating to obtain a resin compact.

\* \* \* \* \*